Sept. 12, 1950     B. B. ISENHOUR     2,521,725
FILM VIEWING DEVICE
Filed Dec. 23, 1947     4 Sheets-Sheet 1
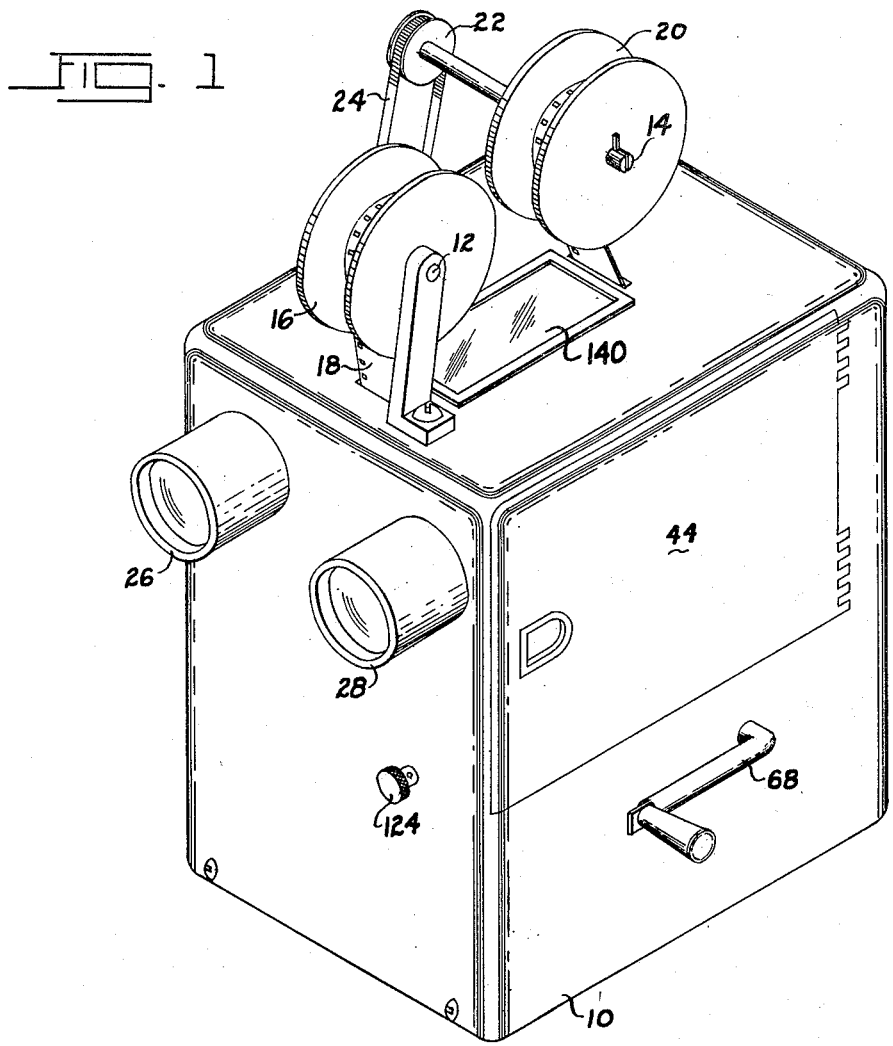
INVENTOR
BURTHEL B. ISENHOUR
BY
Toulmin & Toulmin
ATTORNEYS

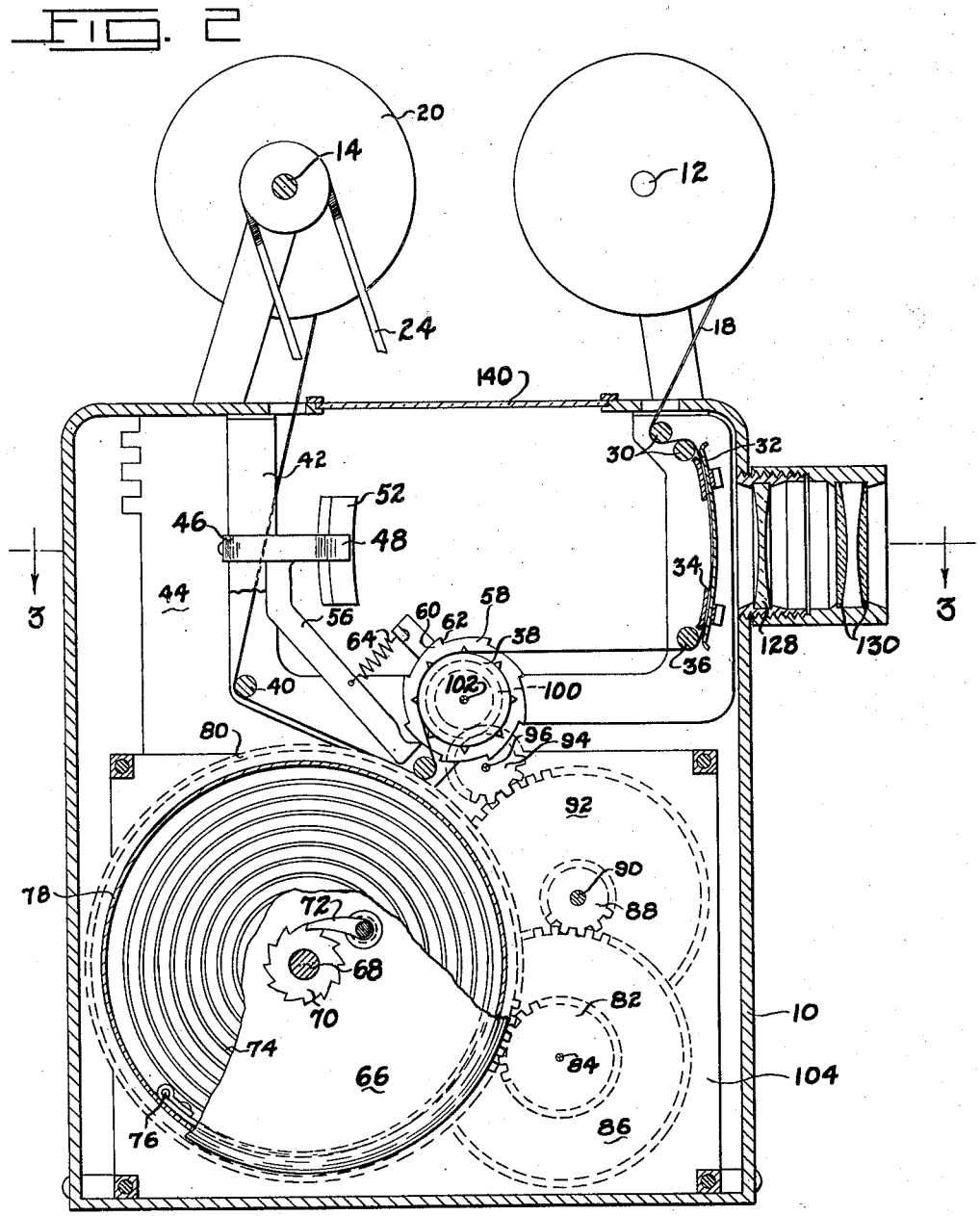

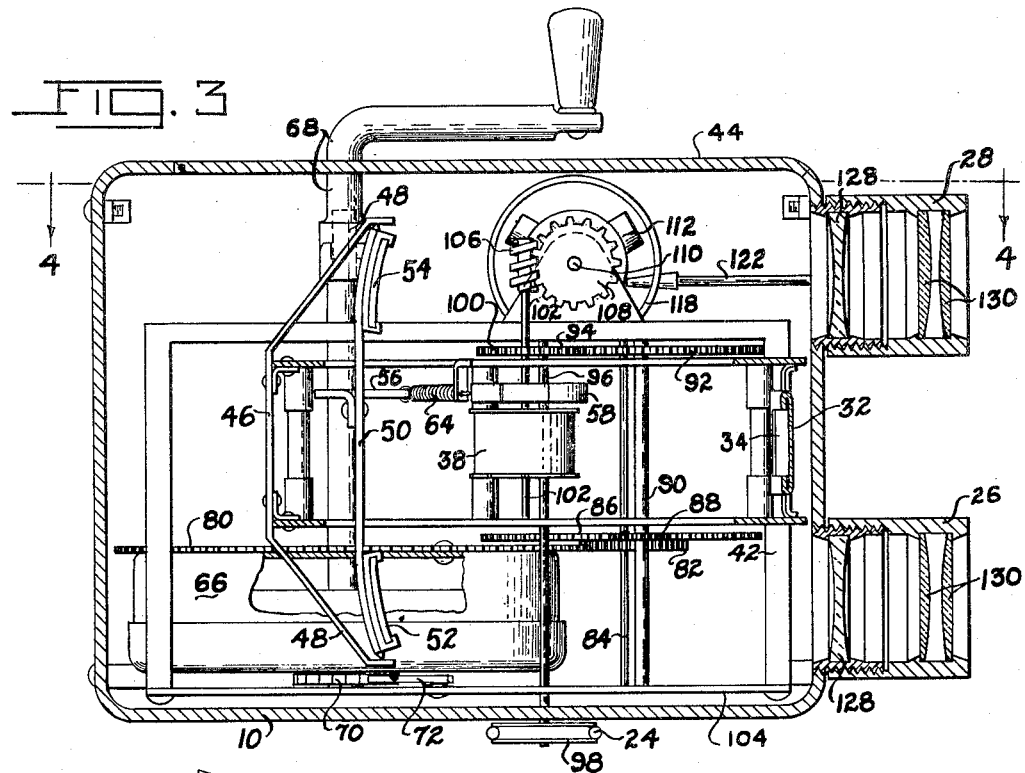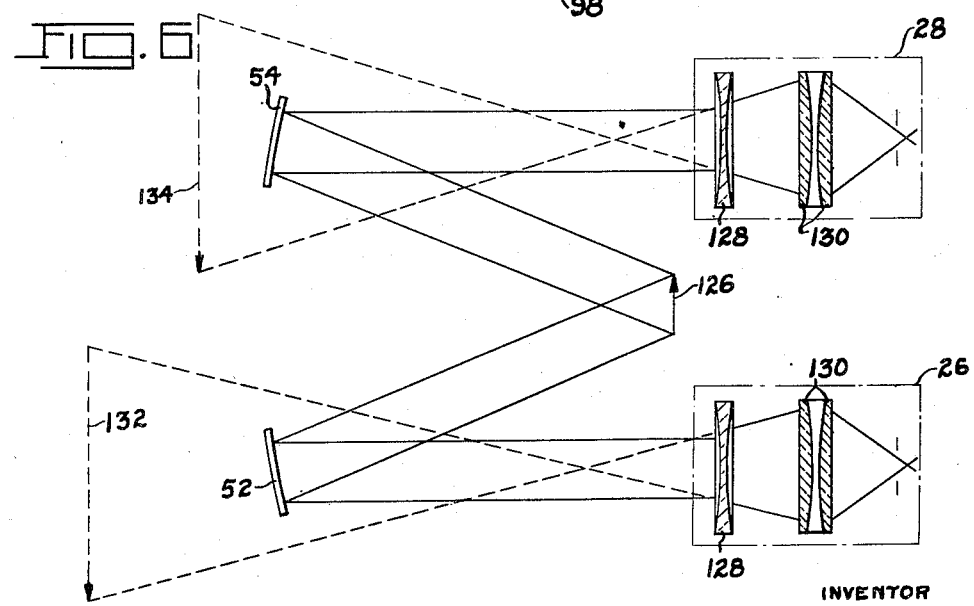

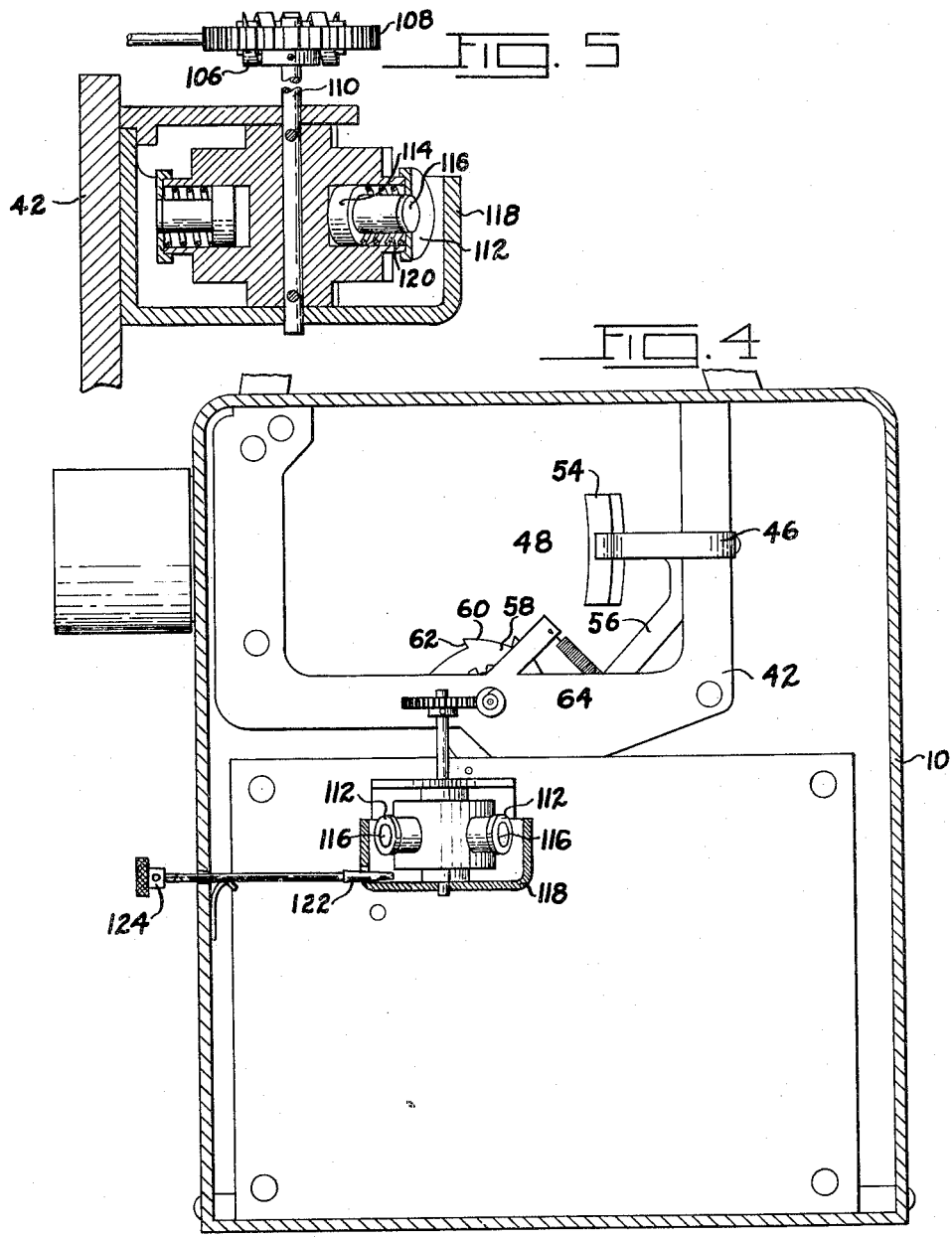

Patented Sept. 12, 1950

2,521,725

UNITED STATES PATENT OFFICE 2,521,725

FILM VIEWING DEVICE

Burthel B. Isenhour, San Antonio, Tex.

Application December 23, 1947, Serial No. 793,395

6 Claims. (Cl. 88—16.8)

This invention relates to film viewing devices, and particularly to such devices so arranged that a false stereoscopic effect is obtained.

In the usual stereoscopic film viewing device two pictures or two films are required which are separately viewed by the two eyes and which produce a true stereoscopic effect because of having been taken by cameras positioned at approximately the same distance apart as the human eyes.

It will be apparent that a true stereoscopic device therefore requires either two cameras specially mounted, or a special mounting for a single camera, and the taking of two pictures either one with each of the two cameras or two with the one camera.

Thereafter, it is necessary for the pictures or films to be carefully mounted to maintain them in alignment and the viewing device must also be adapted for supporting or guiding the pictures or films so that they are properly positioned relative to each other.

One of the principal objects of the present invention is to provide a film viewing device which provides for a stereoscopic effect but utilizes only a single picture or film consisting of single prints of pictures.

It is another object of this invention to provide a device for viewing films which produces a false stereoscopic effect and which is adapted for viewing continuous film or moving pictures.

In the passing of moving pictures through a film viewer or projector they are ordinarily advanced one frame at a time into a viewing or projecting station and by an intermittent motion produced by a Geneva mechanism or similar device so that each frame dwells in the viewing or projection station a substantially longer time than is required for the frame to be moved into the said section.

Due to this dwell in the station as compared to the brief time required to move the frame into the station, the illusion of moving pictures is obtained.

The mechanism for producing this intermittent motion of the film is rather complex and because of the jerking of the film thereby often causes the film to break or be torn. Likewise, the mechanism is often objectionably noisy.

Accordingly, it is a still further object of this invention to provide an improved arrangement for viewing consecutive frames of moving picture films such that the illusion of a moving picture is obtained but without the necessity of intermittently moving the said film.

These and other objects and advantages will become more apparent upon reference to the following description taken in connection with the accompanying drawings in which:

Figure 1 is a perspective view showing a viewing device according to my invention;

Figure 2 is a vertical section through the film viewing device shown in Figure 1;

Figure 3 is a plan view through the device and is indicated by the line 3—3 on Figure 2;

Figure 4 is a vertical section similar to Figure 2 but looking at the device from the opposite side and is indicated by the line 4—4 on Figure 3;

Figure 5 is a vertical section through one type of governor which may be employed for regulating the speed of travel of film through the device; and Figure 6 is a diagrammatic view showing how the images for the separate eyes are produced which result in the false stereoscopic effect.

General arrangement

According to this invention the film or print is prepared, preferably opaque, and bearing a series of successive pictures in the usual manner of motion picture films.

This film or print is mounted on the customary film reel and is fed through the viewing device of this invention and in passing through the said device is engaged by a conventional type drive sprocket.

In its travel between the pay-off reel and the drive sprocket the film passes through a viewing station which consists of a framing guide of sufficient length to frame at least two consecutive frames of the film.

The sprocket wheel is driven in a conventional manner except that the rotation of the said sprocket wheel is at a uniform rate. This may be controlled by any suitable governor mechanism and it results in a uniform speed of travel of the film through the framing guide rather than the customary intermittent motion.

For viewing the film there are provided independent eye pieces consisting of the customary converging and diverging lens arrangements. These eye pieces are spaced apart the normal distance of the human eye and are directed toward a pair of spherical mirrors.

The spherical mirrors are angularly mounted so that in looking through either eye piece the reflection of the film in the framing guide is seen in the associated spherical mirror.

The spherical mirrors are mounted in a frame which is pivotal on a transverse axis and means are provided for oscillating the said frame in synchronism with the travel of the film through the framing guide so that the mirrors follow each frame downwardly through the framing guide and then snap backwardly to the next consecutive frame when it has moved completely into the framing guide. This provides for continuous viewing of each frame except for a fraction of a second during which time the mirrors are moving to become aligned with the next consecutive frame.

In combination with the spherical mirrors, the aforementioned eye piece lens arrangements are designed to produce separate virtual images to be viewed by the separate eyes. These images are different distances from the eyes and thus produce a false stereoscopic effect by requiring the eyes to be focused at different depths.

*Structural arrangement*

Referring to the drawings more in detail, the device of this invention comprises a cabinet 10 having mounted on the top thereof suitable reel supporting shafts such as the pay-off reel shaft 12 and the takeup reel shaft 14. Mounted on the shaft 12 is the payoff reel 16 from which the film 18 is drawn into the cabinet 10. Mounted on the shaft 14 is the takeup reel 20 and the shaft 14 and reel 20 are preferably driven by a pulley 22 over which passes a slip belt 24 of the usual type.

In one side of the cabinet 10 there are a pair of eye pieces 26 and 28 through which the film passing through the cabinet is viewed by the right and left eyes respectively.

The travel of the film through the cabinet is better shown in Figures 2 and 3 wherein it will be seen that the film 18 passes over the rollers 30 and into a framing guide 32 which is arcuately formed and which is of such a length that the aperture 34 in front thereof will accommodate at least two frame lengths of film at one time.

After the film leaves the framing guide 32 it passes over a roller 36 and then is engaged with a sprocket 38. From the sprocket 38 the film passes over other rollers as at 40 and then to the takeup reel 20.

The aforementioned rollers 30, 36 and 40, the sprocket 38 and the framing guide 32 are all mounted in a subframe 42 which is mounted within the cabinet 10 and to which access may be had for threading the film through the device through a door 44 hinged in one side of the cabinet.

As will be seen in Figures 2 and 3 there is carried on the frame 42 a bracket 46 having a pair of arms 48 thereon which extend outwardly and pivotally receive the ends of a bar 50. The bar 50 preferably has pointed pivot means or other members thereon which engage the ends of the arms 48 and provide a substantially friction free support for the said bar in the said arms.

At each end of the bar 50 there are mounted the spherical mirrors indicated at 52 and 54 and these mirrors are so positioned that the principal axis of each extends in a line between the framing guide 32 and the eye piece 26 or 28 associated with the said mirror.

As mentioned before, the mirrors are adapted for oscillating in a vertical plane for following the film during its travel through the framing guide. To this end the bar 50 has connected therewith an arm 56 which extends downwardly and engages a cam wheel 58 carried on the same shaft as the sprocket wheel 38. The cam wheel 58 comprises a plurality of arcuate rises 60 and abrupt shoulders 62 so that as the sprocket rotates to draw film through the framing guide the arm 56 is actuated to tilt the bar 50 to cause the mirrors to follow the frames downwardly through the framing guide until the ends of the said arms drop off the ends of the rises 60.

At this time the arm 56 and bar 50 will be moved to snap the mirrors upwardly to direct them to the frame at the top of the framing guide. A spring 64 continuously urges the arm 56 in the direction to maintain the end of the said arm in engagement with the cam 58.

It will be apparent that the angle through which the mirrors 52 and 54 oscillate is substantially one-half the movement of the film through the framing guide. In this manner the image of the film formed by the mirror is always in alignment with the lenses in the eye pieces. This follows from the well known optical laws defining the formation of images by mirrors and lenses.

The driving of the reels, sprocket wheel 38 and cam wheel 58 is accomplished by a conventional type spring motor 66 which includes a windup crank and shaft 68. As seen in Figures 2 and 3, the shaft 68 has a ratchet wheel 70 on the end adjacent the motor 66 and a pawl 72 carried in the cabinet prevents backward rotation of the said shaft.

Within the housing of the motor 66 the shaft has connected therewith the end of a spiral torsion spring 74, the other end of which is anchored as at 76 on the part 78 of the motor housing. The part 78 of the motor housing also carries a gear 80 which meshes with a smaller gear 82 on a shaft 84.

Also carried on the shaft 84 is a gear 86 larger than the gear 84 and which meshes with a small gear 88 on a shaft 90 extending transversely across the cabinet 10.

On the other end of the shaft 90 there is mounted a larger gear 92 which meshes with a gear 94 and a shaft 96. The shaft 96 extends through the side of the cabinet and has mounted thereon a pulley 98 which drives the slip belt 24 as seen in Figure 3.

The gear 94 meshes with the gear 100 on the shaft 102 on which is mounted the drive sprocket 38 and the cam wheel 58.

For supporting the several shafts and the spring motor there may be provided the frame 104 which is supported within the cabinet in any suitable manner.

It is desirable to control the speed of rotation of the sprocket wheel 38 to provide for a uniform rate of movement of the film and to this end the shaft 102 is extended and has mounted thereon a worm gear 106 which runs on a worm wheel 108 secured to the shaft 110 of a governor mechanism 112.

As seen in Figures 3, 4 and 5, the governor mechanism may comprise a plurality of weights 114 having pads 116 on the end thereof adapted to engage the stationary brake drum 118. The springs 120 normally retain the weights and pads in spaced relation with the brake drum but upon the shaft 110 reaching a predetermined speed, the centrifugal forces acting on the weights cause them to throw outwardly and to bring the pads 116 into braking engagement with the drum 118. This limits the speed of rotation of the shaft 110 and, therefore, the shaft 102 and sprocket wheel 38.

It will be understood that any suitable type of governor can be employed for this purpose and that the type illustrated in the drawings is only an example of such a structure.

The device preferably includes a means for stopping the rotation of the sprocket wheel 38 and for maintaining the said sprocket wheel stationary during the time the spring motor is being wound. Accordingly, there may be provided a locking member 122 operable by a knob 124 from the front of the cabinet and adapted for being inserted beneath the rotating part of the governor mechanism. This provides a means for selectively halting the rotation of the sprocket wheel and is conveniently positioned in the front of the cabinet for operation by the film viewer.

The manner in which the images are formed according to this invention is better seen in the diagrammatic illustration in Figure 6.

In Figure 6, the arrow marked 126 represents the film which is passing through the framing guide. The spherical mirrors 52 and 54 are so arranged that the images thereof are in alignment with the axes of their associated eye pieces 26 and 28.

Each of the eye pieces includes a diverging lens 128 and a converging lens set as at 130. The lenses of the two sets have slightly different focal lengths and as a result the image formed by the eye piece 26 is a virtual image indicated at 132, while the image formed by the eye piece 28 is likewise a virtual image indicated at 134, but the said images are different distances from their respective eye pieces.

Thus, in order to focus the eyes on the images 132 and 134 in Figure 6 the said eyes must be adjusted as though the object being viewed were in three dimensions rather than two. This produces a stereoscopic effect and the desired illusion of a third dimension is created.

It will be understood that even though the images 132 and 134 are different distances from the eye pieces, they are preferably of the same size. This avoids blurring of the picture or the tendency for the observer to see it as a double picture. The effect is a single picture but with the illusion of a third dimension.

In the arrangement shown in the drawings illumination is supplied to the film 18 during its travel through the framing guide through a transparent or translucent opening 140 in the top of the cabinet, but it will be understood that any other suitable illuminating means could be employed for directing light to the surface of the film or picture in the framing guide. For example, a suitably shrouded electric lamp would be satisfactory for illuminating the film and fully equivalent results would obtain.

While this invention has been described in connection with films, it will be understood that it is useful for positive prints, transparent plates, and other objects and hence the term "film" as it appears in the specification and the appended claims is meant to be a generic term for articles to be viewed by an optical device according to the present invention.

It will be understood that this invention is susceptible to modification in order to adapt it to diffeernt usages and conditions and, accordingly, it is desired to comprehend such modifications within this invention as may fall within the scope of the appended claims.

I claim:

1. In a device for viewing objects such as films and the like, a pair of spaced eye pieces including lenses, object supporting means between said eye pieces and supporting the object to be viewed so that it faces away from said eye pieces, and a spherical mirror on the axis of each lens set and inclined to direct the line of sight of each of the eyes of an observer toward the object, said lens sets and mirrors forming separate virtual images of the said object which are at different distances from the eye pieces thereby creating a stereoscopic effect.

2. In a device for viewing films or prints comprising a series of consecutive frames, guiding means for said film, viewing means for said film comprising separate eye pieces having lens sets and mirrows on the axes of said lens sets directing the line of sight thereof toward the film during its travel through said guiding means and forming separate virtual images thereof at different distances from said eye pieces, means for driving said firm through said guiding means at a uniform rate of speed, and means for oscillating said mirrors to maintain each consecutive frame of the film in fixed focus with the viewing systems, said guiding means being in the form of an arc struck from a center on the axis of oscillation of said mirror.

3. In a device for viewing films or prints comprising a series of consecutive frames, film guiding means, separate viewing systems comprising spaced eye pieces having lens sets and spherical mirrors on the axes of said lens sets and inclined to direct the line of sight thereof toward the film in said guiding means, each mirror and its associated lens set forming a virtual image of the film at a different distance from the associated eye piece, drive mechanism for driving said film through said guiding means at a uniform rate of speed, and means driven by said drive mechanism for oscillating said mirrors in unison for retaining each consecutive frame of the film in fixed focus for a predetermined length of time, said film guiding means being in the form of an arc struck from a center lying on the axis of oscillation of said mirror and midway therebetween.

4. In a device for viewing films or prints comprising a series of consecutive frames, a film guide comprising an open frame at least as long as two consecutive frames of said film, separate eye pieces having lens sets therein, separate spherical mirrors supported on the axes of said lens sets and inclined to direct the line of sight therefrom toward said film, means for driving said film through said guiding means at a uniform rate of speed, and cam means driven by said driving means and comprising a gradual rise and an abrupt fall and arranged to oscillate said mirrors whereby they follow each frame of the film during its travel through said guide means and then quickly move into alignment with the next consecutive frame of the film.

5. In a device for viewing motion picture film in order to obtain a stereoscopic effect, guide means for the film being open on one side, spaced eye pieces including lens sets, spherical mirrors on the axes of said lens sets and inclined to direct the line of sight thereof toward the film in said guide, a bracket supporting said mirrors and pivoted for oscillating movements thereof in a vertical plane, means for driving said film at a uniform rate of speed through said guide means, and cam means driven by said driving means and operable to oscillate said mirrors to follow each frame of the film downwardly through said guide means and to snap upwardly to the next frame thereof.

6. In a device for viewing motion picture film to obtain a stereoscopic effect therefrom, a housing, payoff and takeup reels mounted on said housing, guide means in said housing for guiding the film between said reels, a drive sprocket in said housing engaging said film, means for driving at least said drive sprocket and said takeup reel, and means for creating independent virtual images of each consecutive frame of the film comprising a pair of spherical mirrors and spaced eye pieces having lens sets therein having the lines of sight thereof directed toward said mirrors, and means for oscillating said mirrors to retain the image of the film formed thereby on the optical axis of said eye pieces.

BURTHEL B. ISENHOUR.

REFERENCES CITED

The following references are of record in the file of this patent:

UNITED STATES PATENTS

| Number | Name | Date |
|---|---|---|
| 588,916 | Steward et al. | Aug. 24, 1897 |
| 607,171 | Hill | July 12, 1898 |
| 721,954 | Huet et al. | Mar. 3, 1903 |
| 1,265,715 | Tomlinson | May 7, 1918 |
| 1,283,577 | Sloman | Nov. 5, 1918 |
| 1,363,249 | Hallett | Dec. 28, 1920 |
| 1,705,760 | Griffith | Mar. 19, 1929 |
| 1,804,685 | Grimm | May 12, 1931 |
| 2,297,322 | Rasco | Sept. 29, 1942 |

FOREIGN PATENTS

| Number | Country | Date |
|---|---|---|
| 498,167 | France | Oct. 8, 1919 |
| 768,546 | France | Nov. 22, 1934 |